United States Patent [19]

Fujikake et al.

[11] Patent Number: 5,326,852

[45] Date of Patent: Jul. 5, 1994

[54] METHOD FOR PRODUCTION OF ALKYLENE OXIDE POLYMERS

[75] Inventors: Masato Fujikake; Morio Nakamura; Shinji Kobayashi; Katsunori Tanaka; Masahiro Suzuki, all of Himeji, Japan

[73] Assignee: Sumitomo Seika Chemicals Co., Ltd., Hyogo, Japan

[21] Appl. No.: 907,039

[22] Filed: Jul. 1, 1992

[30] Foreign Application Priority Data

Jul. 11, 1991 [JP] Japan ..................... 3-196973

[51] Int. Cl.$^5$ ............................. C08G 65/12
[52] U.S. Cl. ..................... 528/414; 502/156; 502/513
[58] Field of Search ............ 528/414; 502/156, 513

[56] References Cited

FOREIGN PATENT DOCUMENTS 457751 3/1970 Japan.
53-27319 8/1978 Japan.
62-232433 10/1987 Japan.

Primary Examiner—John C. Bleutge
Assistant Examiner—D. Aylward
Attorney, Agent, or Firm—Birch, Stewart, Kolasch & Birch

[57] ABSTRACT

The present invention is directed to a method for production of alkylene oxide polymers comprising reacting an alkylene oxide in an inert hydrocarbon solvent in the presence of a catalyst. The method of the present invention offers alkylene oxide polymers with a great commercial value and a high degree of polymerization which can be produced industrially advantageously with high reproducibility by the use of a catalyst obtained by a simple procedure of applying heat treatment to the product obtained by reacting an organic zinc compound with particular aliphatic polyhydric alcohol and monohydric alcohol.

11 Claims, No Drawings

METHOD FOR PRODUCTION OF ALKYLENE OXIDE POLYMERS

FIELD OF THE INVENTION

The present invention relates to a method for industrial production of alkylene oxide polymers.

Alkylene oxide polymers are useful for various purposes. For example, an ethylene oxide polymer is a useful water-soluble polymer which can be used in a wide variety of fields, including pulp dispersants for paper manufacturing, flocculants, water-soluble films, water-soluble fibers, printing pastes and plasticizers.

BACKGROUND OF THE INVENTION

Generally, the commercial value of alkylene oxide polymers increases with the degree of polymerization. For example, when an ethylene oxide polymer as described above is used as a pulp dispersant for paper manufacturing, the optimum amount of its use varies depending on the molecular weight thereof. Because the effect generally increases as the molecular weight of the polymer increases, a polymer with higher degree of polymerization makes it possible to accomplish the object with a smaller amount when compared to a polymer with lower degree of polymerization. In other words, the use of a polymer with low molecular weight is uneconomical because it results in an increase in the amount of a polymer used, and it is also undesirable for paper manufacturing because it worsens the homogeneity of paper surface. On the other hand, the use of a polymer with high degree of polymerization as a thickener offers not only the excellent viscosity increasing effect with a smaller amount of use but also a great viscosity increasing effect which cannot be achieved by a polymer with low degree of polymerization, because an increase of the degree of polymerization results in a rapid rise of aqueous solution viscosity.

For these reasons, a development of a novel method which permits industrially reproducible manufacturing of alkylene oxide polymers with higher degree of polymerization is in demand in the relevant field.

A large number of studies have been made on the polymerization of alkylene oxides, particularly on ethylene oxide and propylene oxide. For example, it is known that the product obtained by reacting an organic zinc compound with a polyhydric alcohol and further reacting the reaction product with a monohydric alcohol, or the product obtained by reacting an organic zinc compound with a monohydric alcohol and further reacting the reaction product with a polyhydric alcohol (Japanese Patent Examined Publication Nos. 7751/1970 and 27319/1978) exhibits excellent catalytic activity on alkylene oxide homopolymerization or copolymerization of two or more alkylene oxides so that a polymer with a high degree of polymerization can be obtained.

It has been pointed out, however, that these methods are faulty, i.e., industrially advantageous production cannot be achieved, because the reproducibility of polymerization velocity, the degree of polymerization of the polymer obtained, etc., are poor. Further, its yield is insufficient and the polymerization product becomes lumpy. Moreover, even the degree of polymerization remains unsatisfactory. Alternatively, it has been attempted in another method to obtain a polymer with high reproducibility by using as a catalyst the product obtained by reacting an organic zinc compound and a polyhydric alcohol (Japanese Patent Laid-Open No. 232433/1987) in contact with various fine granular metal oxides and nonionic surfactants as dispersion aids. However, this method has been pointed out to have difficulty in the catalyst preparation.

SUMMARY OF THE INVENTION

It is an object of the present invention to provide a method for industrially advantageous, highly reproducible production of alkylene oxide polymers with great commercial value and high degree of polymerization.

In view of this situation, the present inventors have investigated a method for a stable and highly reproducible production of alkylene oxide polymers with high degree of polymerization. As a result, the present inventors have found that the use, as a polymerization catalyst, of the product obtained by reacting a particular equivalent ratio of an organic zinc compound, an aliphatic polyhydric alcohol and a monohydric alcohol, then followed by heating in a specified temperature range makes it possible to obtain alkylene oxide polymers with very high reproducibility with a very small amount of catalyst in a short time, and under certain conditions offers alkylene oxide polymers with unexpectedly markedly higher degree of polymerization, in comparison with the polymers obtained by conventional methods. The inventors have made further investigations based on this finding, and have thus developed the present invention.

Accordingly, the present invention essentially relates to a method for production of alkylene oxide polymers comprising reacting an alkylene oxide in an inert hydrocarbon solvent in the presence of a catalyst, wherein said catalyst is obtained by applying heat treatment at 80° to 200° C. to the product obtained by reacting an organic zinc compound with an aliphatic polyhydric alcohol in an amount of 0.2 to 1.1 equivalent based on the organic zinc compound and further reacting the reaction product with a monohydric alcohol in an amount of not less than 0.1 equivalent based on the organic zinc compound.

DETAILED DESCRIPTION OF THE INVENTION

In the present invention, the organic zinc compound which is the base material for the catalyst used is represented by the formula $ZnR_2$, wherein R represents an alkyl group having 1 to 6 carbon atoms, a phenyl group, a cycloalkyl group having 4 to 6 carbon atoms and the like. Examples of such organic zinc compounds include dialkylzinc such as dimethylzinc, diethylzinc, di-n-propylzinc and dibutylzinc; diphenylzinc, and dicyclobutylzinc.

The aliphatic polyhydric alcohol used for the present invention means an aliphatic alcohol having two or more carbon atoms and two or more hydroxyl groups, with preference given to aliphatic polyhydric alcohols having 4 carbon atoms. Examples of such aliphatic polyhydric alcohols include ethylene glycol, propylene glycol, 1,2-butanediol, 1,3-butanediol, 1,4-butanediol, 2,3-butanediol, 1,5-pentanediol, 2,3,4-pentanetriol, glycerol and pentaerythritol, with better results obtained by the use of 1,3-butanediol or 1,4-butanediol.

The monohydric alcohol used for the present invention is an organic compound having one hydroxyl group with no other active hydrogen, and aliphatic alcohols having 1 to 6 carbon atoms are used for the present invention. Examples of such aliphatic alcohols include methanol, ethanol, propanol, butanol and pentanol, with better results obtained by the use of ethanol, propanol or butanol.

The catalyst used for the present invention is usually prepared by heating the reaction product obtained by the method as described below in an inert gas atmosphere such as nitrogen gas in the presence of inert hydrocarbon solvent such as pentane, hexane, heptane, cyclohexane or other aliphatic hydrocarbons.

For example, an organic zinc compound which is dissolved in an inert hydrocarbon, and a polyhydric alcohol are reacted in the first step, and the reaction product in the first step and a monohydric alcohol are reacted in the second step, and subsequently, in the third step, the product obtained is heated. In the reaction with the polyhydric alcohol, the ratio of the organic zinc compound and the polyhydric alcohol is normally 0.2 to 1.1 equivalent of the polyhydric alcohol, preferably 0.5 to 0.9 equivalent, based on the organic zinc compound. If the amount of the polyhydric alcohol is less than 0.2 equivalent, polymerization velocity extremely declines, and if it exceeds 1.1 equivalent, the resulting polymer becomes lumpy so that it cannot be obtained as a powder.

Although the upper limit of the amount of the monohydric alcohol used in the second step reaction is not subject to limitation because the unreacted component is distilled off in the heating process, it is common practice to use the monohydric alcohol in an amount of not less than 0.1 equivalent based on the organic zinc compound used for the reaction in the first step. If the amount of the monohydric alcohol is less than 0.1 equivalent, polymerization does not proceed smoothly.

The heating temperature in the third step is normally 80° to 200° C., preferably 120° to 150° C. A temperature of lower than 80° C. gives almost the same results as those of no heat treatment. For example, the reproducibility of polymerization velocity and the degree of polymerization of the polymer obtained are poor. A temperature exceeding 200° C. markedly lowers the catalytic activity so that polymerization time becomes extremely long.

In the above method, although an organic zinc compound and a polyhydric alcohol are reacted, followed by a reaction with a monohydric alcohol, the order of the reactions with the alcohols may be inverted, or an organic zinc compound, a polyhydric alcohol and a monohydric alcohol may be simultaneously reacted in the same molar ratio as above, and there are no limitations on how to react the three substances.

Although the time for heat treatment of the third step cannot be definitely determined because it varies depending on its heating temperature, it is properly determined in the range normally from 5 to 180 minutes, preferably from 10 to 60 minutes. Too short or too long heating times are undesirable because a sufficient catalytic activity cannot be achieved in the former case, and the catalytic activity declines in the latter case. In the heat treatment, better results are often obtained when it is carried out while distilling off the unreacted polyhydric alcohol and monohydric alcohol.

Since the catalyst thus obtained has markedly improved activity, its use as the catalyst for alkylene oxide polymerization makes it possible to produce alkylene oxide polymers with very high reproducibility with a very small amount of catalyst in a short time. Also, controlling the production conditions makes it possible to obtain alkylene oxide polymers with a markedly higher degree of polymerization in comparison with the polymers obtained by conventional methods.

Examples of the alkylene oxides for the present invention include ethylene oxide, propylene oxide, butylene oxide, cyclohexene oxide, styrene oxide and epichlorohydrin. The polymer obtained by the present invention is a homopolymer of such alkylene oxides or a copolymer of two or more alkylene oxides.

The inert hydrocarbon described above can also be used as a solvent for carrying out polymerization reaction applying the method of the present invention. The polymerization reaction is carried out with appropriate stirring or shaking for smooth progress. Although polymerization temperature can be optionally selected depending on the types and the concentration of the monomer alkylene oxide and other reaction conditions such as catalyst concentration, it is normally 5° to 100° C., preferably 20° to 50° C.

Although the amount of catalyst used for polymerization is not subject to limitation, it can be varied in the range from 0.01 to 1 mol % based on the zinc atom content per mol of the monomer supplied. Also, the alkylene oxide polymers obtained can easily be separated from the solvent as a fine granular product without lump formation. The alkylene oxide polymers thus obtained have an intrinsic viscosity of 15 to 26, and they can be obtained with high reproducibility; under appropriately selected conditions, it is also possible to obtain alkylene oxide polymers having an intrinsic viscosity of 22 to 26 which have a higher degree of polymerization than that of the polymers obtained by conventional methods.

Generally, alkylene oxide polymerization using an organic zinc compound is thought to be involved in a mechanism wherein the alkylene oxide is coordinated on zinc and allowed to come into sequential ring-opening addition. Although the effect of heat treatment according to the present invention, i.e., the mechanism for high reproducibility of obtaining the alkylene oxide polymers remains unknown, it can be speculated that this is because coordination selectivity of alkylene oxides is improved as a result of progress of the zinc alkoxide condensation reaction caused by the heat treatment.

According to the method of the present invention, alkylene oxide polymers with great commercial value and high degree of polymerization can be produced industrially advantageously with high reproducibility by the use of a catalyst obtained by a simple procedure of heat treatment to the product obtained by reacting an organic zinc compound with particular aliphatic polyhydric alcohol and monohydric alcohol.

EXAMPLES

The present invention is hereinafter described in more detail by means of the following working examples and comparative examples, but the present invention is not limited thereto.

The intrinsic viscosities of the alkylene oxide polymers obtained by the present invention were determined as follows: Determination of intrinsic viscosity The alkylene oxide polymers were dissolved in ion exchanged water. The viscosities of 0.01%, 0.03%, 0.05% and 0.1% by weight aqueous solutions were determined using an Ostwald viscometer, and an intrinsic viscosity was calculated by the conventional method.

EXAMPLE 1

18.3 g of n-hexane, 47.7 g of aliphatic hydrocarbon with a high boiling point (trade name: No. 0 Solvent, produced by Nippon Oil Co., Ltd.) and 7.4 g of diethylzinc were placed in a nitrogen-replaced flask, and while vigorously stirring the mixture under cooling conditions, 4.3 g of 1,4-butanediol was gradually added drop by drop. The reaction immediately took place, and ethane gas evolved. After completion of dropwise addition, the mixture was stirred at 30° C. for 1 hour and then at 50° C. for 1 hour to complete the reaction.

In the second step, 3.6 g of ethyl alcohol was gradually added drop by drop to the reaction solution obtained by the above step at an internal temperature of 20° C., and the reaction immediately took place while evolving ethane gas. Then, the mixture was stirred at 40° C. for 1 hour to complete the reaction, followed by heat treatment at 140° C. for 20 minutes while distilling off the unreacted components. A white, turbid, slightly viscous liquid catalyst was thus obtained.

345 g of n-hexane was placed in a thoroughly nitrogen-replaced 1-liter pressure-resistant vessel, and a 1/120 amount of the catalyst thus obtained was uniformly dispersed therein. 84 g of ethylene oxide was added thereto, and the vessel was sealed tightly, and the polymerization was carried out at 40° C. for 6 hours while stirring.

After completion of the polymerization, the resulting white product was separated by filtration and dried under reduced pressure at 40° C. to yield 81 g of polyethylene oxide. The yield was 97%. The polyethylene oxide thus obtained had an intrinsic viscosity of 24.3. The same experiment was repeated 10 times, with the yield ranging from 95 to 98% and the intrinsic viscosity ranging from 23.7 to 24.3, both showing good reproducibility.

EXAMPLE 2

In the reaction for the catalyst preparation in Example 1, 1,4-butanediol and ethyl alcohol were mixed, and while vigorously stirring under cooling conditions, this mixture was gradually added drop by drop into diethylzinc-containing n-hexane and aliphatic hydrocarbon with a high boiling point. After completion of dropwise addition, the mixture was stirred at 30° C. for 1 hour and then at 50° C. for 1 hour to complete the reaction. Then, a heat treatment was carried out at 130° C. for 20 minutes to yield a catalyst.

345 g of hexane was placed in a thoroughly nitrogen-replaced 1-liter pressure-resistant reaction vessel, and a 1/60 amount of the catalyst thus obtained was uniformly dispersed therein. 84 g of ethylene oxide was added thereto, and the vessel was sealed tightly, and the polymerization was carried out at 40° C. while stirring. The yield after 6 hours was 92%. Polyethylene oxide thus obtained had an intrinsic viscosity of 24.0.

EXAMPLE 3

In the reaction for the catalyst preparation in Example 1, the order of the dropwise addition of the alcohols was inverted. That is, ethyl alcohol was first reacted, and 1,4-butanediol was then reacted, followed by heat treatment at 120° C. for 40 minutes to yield a catalyst. The polymerization reaction was carried out in the same manner as in Example 1 to yield a polymer. After 6 hours of the polymerization reaction, the yield was 88%. The polyethylene oxide thus obtained had an intrinsic viscosity of 23.7.

EXAMPLE 4

Ethylene oxide was polymerized in n-hexane in the same manner as in Example 1 except that 1,4-butanediol was replaced by 1,3-butanediol in the catalyst preparation and the amount of catalyst obtained was changed to 1/60. After 15 hours of the polymerization reaction, the yield was 98%. The polyethylene oxide thus obtained had an intrinsic viscosity of 21.5.

EXAMPLE 5

Ethylene oxide was polymerized in n-hexane in the same manner as in Example 1 except that 3.6 g of ethyl alcohol was replaced by 5.8 g of 1-butanol and the heat treatment was carried out at 110° C. for 30 minutes in the catalyst preparation. After 5 hours of the polymerization reaction, the yield was 93%. The polyethylene oxide thus obtained had an intrinsic viscosity of 20.4.

EXAMPLE 6

Ethylene oxide was polymerized in n-hexane in the same manner as in Example 1 except that 3.6 g of ethyl alcohol was replaced by 3.8 g of methanol in the catalyst preparation and the amount of the catalyst obtained was changed to 1/60. After 10 hours of the polymerization reaction, the yield was 88%. The polyethylene oxide thus obtained had an intrinsic viscosity of 20.8.

EXAMPLE 7

Ethylene oxide was polymerized in n-hexane in the same manner as in Example 1 except that the amount of 1,4-butanediol used was changed to 2.7 g and the amount of ethyl alcohol used was changed to 3.9 g in the catalyst preparation and the amount of the catalyst obtained was changed to 1/60. After 14 hours of the polymerization reaction, the yield was 94%. The polyethylene oxide thus obtained had an intrinsic viscosity of 22.0.

EXAMPLE 8

Ethylene oxide was polymerized in n-hexane in the same manner as in Example 1 except that the heat treatment was carried out at 100° C. for 10 minutes in the catalyst preparation. After 6 hours of the polymerization reaction, the yield was 97%. The polyethylene oxide thus obtained had an intrinsic viscosity of 19.4.

EXAMPLE 9

Ethylene oxide was polymerized in n-hexane in the same manner as in Example 1 except that the heat treatment was carried out at 180° C. for 20 minutes in the catalyst preparation and the amount of the catalyst obtained was changed to 1/60. After 16 hours of the polymerization reaction, the yield was 92%. The polyethylene oxide thus obtained had an intrinsic viscosity of 22.0.

EXAMPLE 10

Ethylene oxide was polymerized in n-hexane in the same manner as in Example 1 except that 7.4 g of diethylzinc was replaced by 5.7 g of dimethylzinc in the catalyst preparation. After 6 hours of the polymerization reaction, the yield was 96%. The polyethylene oxide thus obtained had an intrinsic viscosity of 23.7.

EXAMPLE 11

Ethylene oxide was polymerized in n-hexane in the same manner as in Example 1 except that n-hexane was replaced by the same amount of heptane and the heat treatment was carried out at 110° C. for 10 minutes in the catalyst preparation. After 6 hours of the polymerization reaction, the yield was 95%. The polyethylene oxide thus obtained had an intrinsic viscosity of 18.6.

EXAMPLE 12

Ethylene oxide was polymerized in n-hexane in the same manner as in Example 1 except that n-hexane was replaced by the same amount of cyclohexane and the heat treatment was carried out at 90° C. for 20 minutes in the catalyst preparation. After 6 hours of the polymerization reaction, the yield was 95%. The polyethylene oxide thus obtained had an intrinsic viscosity of 17.0.

EXAMPLE 13

345 g of n-hexane was placed in a thoroughly nitrogen-replaced 1-liter pressure-resistant vessel, and a 1/60 amount of the catalyst prepared in the same manner as in Example 1 was uniformly dispersed therein. 75 g of ethylene oxide and 11 g of propylene oxide were added thereto, and the vessel was sealed tightly, and the polymerization was carried out at 40° C. for 5 hours while stirring. The yield after 5 hours was 90%. A copolymer of ethylene oxide and propylene oxide thus obtained had an intrinsic viscosity of 22.0.

COMPARATIVE EXAMPLE 1

Ethylene oxide was polymerized in n-hexane in the same manner as in Example 1 except that no heat treatment was carried out in the catalyst preparation and the amount of the catalyst obtained was changed to 1/60. After 20 hours of the polymerization reaction, the yield was 65%. The polyethylene oxide thus obtained had an intrinsic viscosity of 12.0. Although the same experiment was repeated 10 times, only the first test showed a good yield (90%).

COMPARATIVE EXAMPLE 2

Ethylene oxide was polymerized in n-hexane in the same manner as in Example 6 except that no heat treatment was carried out in the catalyst preparation. After 40 minutes of an induction period, the polymerization reaction proceeded violently, and the reaction product became lump.

COMPARATIVE EXAMPLE 3

Ethylene oxide was polymerized in n-hexane in the same manner as in Example 1 except that the amount of 1,4-butanediol used was changed to 0.54 g and the amount of ethyl alcohol used was changed to 6.1 g in the catalyst preparation and the amount of the catalyst obtained was changed to 1/60. After 9 hours of the polymerization reaction, the yield was 10%.

COMPARATIVE EXAMPLE 4

Ethylene oxide was polymerized in n-hexane in the same manner as in Example 1 except that the amount of 1,4-butanediol used was changed to 7.0 g and the amount of ethyl alcohol used was changed to 1.1 g in the catalyst preparation. The polymerization reaction proceeded violently, and the reaction product became lumpy.

What is claimed is:

1. A method for production of alkylene oxide polymers comprising reacting an alkylene oxide in an inert hydrocarbon solvent in the presence of a catalyst, wherein said catalyst is obtained by the method comprising the steps of:
   (a) reacting a zinc compound represented by the formula $ZnR_2$, wherein R represents an alkyl group having 1 to 6 carbon atoms, with an aliphatic polyhydric alcohol having two or more carbon atoms and two or more hydroxyl groups in an amount of 0.2 to 1.1 equivalent based on said zinc compound;
   (b) reacting the obtained reaction product in the step (a) with a monohydric alcohol having 1 to 6 carbon atoms in an amount of not less than 0.1 equivalent based on said zinc compound; and
   (c) applying heat treatment at 80° to 200° C. for 5 to 180 minutes to the reaction product obtained in the step (b).

2. The method according to claim 1, wherein said zinc compound is selected from the group consisting of dimethylzinc, diethylzinc, di-n-propylzinc, dibutylzinc, diphenylzinc and dicyclobutylzinc.

3. The method according to claim 2, wherein said organic zinc compound is dialkylzinc.

4. The method according to claim 1, wherein the aliphatic polyhydric alcohol is selected from the group consisting of ethylene glycol, proplyene glycol, 1,2-butanediol, 1,3-butanediol, 1,4-butanediol, 2,3-butanediol, 1,5-pentanediol, 2,3,4-pentanetriol, glycerol and pentaerythritol.

5. The method according to claim 4, wherein said aliphatic polyhydric alcohol is 1,4-butanediol or 1,3-butanediol.

6. The method according to claim 1, wherein the monohydric alcohol is selected from the group consisting of methanol, ethanol, propanol, butanol and pentanol.

7. The method according to claim 1, further comprising the step of dissolving the said zinc compound in an inert hydrocarbon solvent selected from the group consisting of pentane, hexane, heptane and cyclohexane.

8. The method according to claim 1, wherein the ratio of said zinc compound and said aliphatic polyhydric alcohol is 0.5 to 0.9 equivalent based on said zinc compound.

9. The method according to claim 1, wherein the application of the heat treatment is carried out at 120° to 150° C.

10. A method for production of alkylene oxide polymers comprising reacting an alkylene oxide in an inert hydrocarbon solvent in the presence of a catalyst, wherein said catalyst is obtained by the method comprising the steps of:
    (a) reacting a zinc compound represented by the formula $ZnR_2$, wherein R represents an alkyl group having 1 to 6 carbon atoms, with a monohydric alcohol having 1 to 6 carbon atoms in an amount of not less than 0.1 equivalent based on said zinc compound;
    (b) reacting the obtained reaction product in the step (a) with an aliphatic polyhydric alcohol having two or more carbon atoms and two or more hydroxyl groups in an amount of 0.2 to 1.1 equivalent based on said zinc compound; and (c) applying heat treatment at 80° to 200° C. for 5 to 180 minutes to the reaction product obtained in the step (b).

11. A method for production of alkylene oxide polymers comprising reacting an alkylene oxide in an inert hydrocarbon solvent in the presence of a catalyst, wherein said catalyst is obtained by the method comprising the steps of:

(a) reacting a zinc compound represented by the formula $ZnR_2$, wherein R represents an alkyl group having 1 to 6 carbon atoms, simultaneously with a monohydric alcohol having 1 to 6 carbon atoms in an amount of not less than 0.1 equivalent based on said zinc compound and an aliphatic polyhydric alcohol having two or more carbon atoms and two or more hydroxyl groups in an amount of 0.2 to 1.1 equivalent based on said zinc compound; and (b) applying heat treatment at 80° to 200° C. for 5 to 180 minutes to reaction reproduced obtained in the step (a).

* * * * *